US006249984B1

United States Patent
Barsky et al.

(10) Patent No.: US 6,249,984 B1
(45) Date of Patent: Jun. 26, 2001

(54) ELECTROLYTIC TILT SENSOR HAVING A METALLIC ENVELOPE

(75) Inventors: Barry E. Barsky, Huntingdon Valley; Lester E. Burgess, Swarthmore; Francis R. Kull, Quakertown, all of PA (US)

(73) Assignee: The Fredericks Company, Huntingdon Valley, PA (US)

( * ) Notice: Subject to any disclaimer, the term of this patent is extended or adjusted under 35 U.S.C. 154(b) by 0 days.

(21) Appl. No.: 09/544,533

(22) Filed: Apr. 6, 2000

(51) Int. Cl.[7] ................. G01C 9/06; G01C 9/26
(52) U.S. Cl. ................... 33/366.15; 33/366.21
(58) Field of Search ............... 33/366.11, 366.12, 33/366.15, 366.21, 366.22, 366.26

(56) References Cited

U.S. PATENT DOCUMENTS

| | | |
|---|---|---|
| 1,634,934 | 7/1927 | Donaldson . |
| 2,852,646 | 9/1958 | Broadley, Jr. ............... 201/57 |
| 3,171,213 | 3/1965 | Swarts et al. ............... 36/206 |
| 3,186,224 * | 6/1965 | Mair ........................ 33/366.15 |
| 3,290,786 | 12/1966 | Parkin ....................... 33/206 |
| 3,464,276 * | 9/1969 | Leibert ...................... 33/366.12 |
| 3,487,303 | 12/1969 | Remington ................. 324/65 |
| 3,843,539 | 10/1974 | Willing et al. ............. 252/62.2 |
| 3,906,471 | 9/1975 | Shawhan .................... 340/200 |
| 3,937,078 | 2/1976 | Williams .................... 73/189 |
| 3,992,951 | 11/1976 | Erspamer et al. .......... 73/497 |
| 4,344,235 | 8/1982 | Flanders .................... 33/366 |
| 4,365,421 | 12/1982 | Byrum ....................... 33/366 |
| 4,496,836 | 1/1985 | Mikesell .................... 250/231 |
| 4,497,118 | 2/1985 | Byrum ....................... 33/366 |
| 4,517,750 | 5/1985 | Netzer ....................... 33/396 |
| 4,583,296 | 4/1986 | Dell'Acqua ................ 33/366 |
| 4,641,434 | 2/1987 | Engler ....................... 33/366 |
| 4,846,954 | 7/1989 | Ryan et al. ................. 33/366 |
| 4,937,518 | 6/1990 | Donati et al. ............... 324/716 |
| 4,972,595 | 11/1990 | Shimmura et al. ......... 33/366 |
| 5,031,329 | 7/1991 | Smallidge .................. 33/366 |
| 5,079,847 | 1/1992 | Swartz et al. .............. 33/366 |
| 5,159,761 | 11/1992 | Cagan et al. ............... 33/366 |
| 5,170,567 | 12/1992 | Davis et al. ............... 33/366 |
| 5,174,033 | 12/1992 | Rider ......................... 333/366 |
| 5,180,986 | 1/1993 | Swartz et al. .............. 324/660 |
| 5,279,040 | 1/1994 | Kippelt et al. ............. 33/366 |
| 5,428,902 | 7/1995 | Cheah ........................ 33/366 |
| 5,581,034 | 12/1996 | Dao et al. ................... 73/514.09 |
| 5,612,679 | 3/1997 | Burgess ...................... 340/689 |
| 5,630,280 | 5/1997 | Crossan, Jr. ................ 33/366 |
| 5,731,761 | 3/1998 | Sychra ........................ 340/689 |
| 5,774,996 * | 7/1998 | Ogawa et al. .............. 33/366.12 |
| 5,852,878 | 12/1998 | Seipp, Jr. et al. .......... 33/366 |
| 5,930,907 * | 8/1999 | Ogawa et al. .............. 33/366.15 |

FOREIGN PATENT DOCUMENTS

| | | |
|---|---|---|
| 3608274 C2 | 6/1988 | (DE) . |
| 40 25 184 A1 | 2/1992 | (DE) . |
| 0 117 226 A2 | 8/1984 | (EP) . |
| 0 358 788 A1 | 3/1990 | (EP) . |
| 2 647 544 | 11/1990 | (FR) . |
| 733973 | 7/1955 | (GB) . |

* cited by examiner

Primary Examiner—G. Bradley Bennett
(74) Attorney, Agent, or Firm—Drinker Biddle & Reath LLP

(57) ABSTRACT

An electrolytic tilt sensor and a method of assembling the tilt sensor. The tilt sensor includes a metallic envelope comprising a metal container and a metal header welded to the enclosure, hermetically sealing the envelope. The envelope defines a chamber that contains an electrolytic solution and a plurality of electrodes. The electrodes extending through the header from outside of the envelope into the chamber. Each electrode is located in a separate aperture within the header and is insulated from the envelope by an insulator located between the electrode and the header. The method of assembling the tilt sensor includes the steps of placing the electrolytic solution into the container through an opening, engaging the header with the opening and welding the container and header to one another to hermetically seal the envelope.

36 Claims, 7 Drawing Sheets

ELECTROLYTIC TILT SENSOR HAVING A METALLIC ENVELOPE

FIELD OF THE INVENTION

The present invention relates generally to electrochemical transducers and, more particularly, to electrolytic tilt sensors.

BACKGROUND OF THE INVENTION

Electrolytic tilt sensors include devices that provide output signals proportional to the angle of tilt and/or the direction of tilt when included as part of an appropriate electrical circuit. Tilt sensors were originally developed for weapons delivery and aircraft navigation and are now used in applications such as oil drilling, construction laser systems, automotive wheel alignment, seismic and geophysical monitoring, virtual reality systems, and robotic manipulators.

Most conventional electrolytic tilt sensors generally comprise a housing, or envelope, made of a non-conductive material, such as glass. The envelope is partially filled with an electrolytic solution and encloses a plurality of electrodes, which are partially immersed in the electrolytic solution when the tilt sensor is in its upright (i.e., zero tilt or electrical null) position. One of the electrodes, typically a center electrode, is a common electrode, and the remaining electrodes are sensing electrodes, which are typically grouped in one or more pairs that define one or more distinct tilt axes in conjunction with the center common electrode.

As the tilt sensor is tilted with respect to the horizontal, each of the sensing electrodes becomes more or less immersed in the electrolytic solution while the surface of the solution remains level with reference to the horizontal. The increase or decrease in immersion results in a corresponding change in impedance between any one of the sensing electrodes and the common electrode. This impedance change is measured by an electrical circuit and correlated to a tilt angle and/or tilt direction, depending on the number of sensing electrodes and the type of electrical circuit being used.

A shortcoming of glass-enclosed tilt sensors is that they are relatively fragile due to their glass construction. Glass-enclosed sensors must be handled with care and protected in special containment packages. They are costly to manufacture and generally use precious metal electrodes. Moreover, glass enclosed sensors may not be suitable for certain applications where a tilt sensor having a more robust enclosure is required.

In addition to electrolytic tilt sensors having non-conductive envelopes, tilt sensors having partially metallic envelopes, such as those disclosed in U.S. Pat. No. 5,630,280 to Crossan, Jr. and German Patent Publication No. DE 40 25 184 A1 to Geisel, have been described. Generally, such tilt sensors have two or four sensing electrodes extending into a chamber defined by the envelope, which comprises a metallic containment vessel and a header made of a non-conductive material. The metallic containment vessel functions as the common electrode while the header supports the sensing electrodes and insulates them from the metallic containment vessel.

A shortcoming of the Crossan, Jr. tilt sensor is that the relatively large glass seal can be susceptible to cracking caused by rough handling, age, harsh environment, and the like, which would lead to failure of the tilt sensor due to leakage of the electrolytic solution. In addition, the interface between the dissimilar materials of the seal and the containment vessel may provide a less than desirable seal, particularly if the tilt sensor were exposed to elevated temperatures.

At elevated temperatures the pressure inside the tilt sensor increases due to expansion of the gas and vaporization of the electrolytic solution inside the tilt sensor. When the temperature becomes too high, vaporized solution can escape between the seal and the containment vessel. Loss of even only part of the electrolytic solution will detrimentally affect the operation of the sensor.

The Geisel tilt sensor has a compression-fit O-ring gasket located between the containment vessel and the insulating header. A shortcoming of the gasket is that it is subject to deterioration over time, which may eventually cause the electrolytic solution to leak from the sensor. The Geisel tilt sensor also may be susceptible to vapor leakage and pressure loss due to failure of the mechanical seal at elevated internal pressures resulting from exposure to elevated temperatures. In addition, a gasket-type seal requires the additional gasket component, which adds to the complexity, difficulty, and cost of manufacturing the tilt sensor. Moreover, the Geisel electrodes appear to be adhesively bonded to the insulating header. Such adhesive bonds would be susceptible to destruction by the solvents of the electrolyte, particularly at elevated operating temperatures. Furthermore, neither the Crossan, Jr. nor Geisel tilt sensor is operable unless the containmnent vessel functions as the common electrode.

Due to the shortcomings of the above-mentioned tilt sensors, there is a need for a tilt sensor having a robust envelope and a highly reliable seal between the header and the containment vessel. In addition, there is a need for a tilt sensor having a metallic envelope and a center common electrode extending into the chamber defined by the envelope.

GLOSSARY

1. Acquiescent bath (still bath): An electrolytic cell, which is not agitated and depends solely on ionic movement by diffusion mechanisms.
2. Bipolar electrode: An electrode which is not directly connected to the power supply but is so placed in the solution between the anode and the cathode that the part nearest the anode becomes cathodic and the part nearest the cathode becomes anodic.
3. Concentration gradient: A thin region of electrolyte directly adjacent to the electrode which is primarily responsible for polarization effects.
4. Convection: The thermal energy process by which mass is transmitted through a material by bulk motion of the media itself.
5. Diffusion: In chemistry, the spontaneous migration of substances from regions where their concentrations are high to regions where their concentrations are low.
6. Electrical Null: Indicated by a minimal or zero electrical output value.
7. Electrolytic cell: (Electrolytic cell, bath, or tank with electrodes and electrolyte) A unit apparatus designed for carrying out an electrochemical reaction; includes a vessel, two or more electrodes, and one or more eletrolytes.
8. Flux: The presence of a force field in a specified physical medium, or the flow of energy through a surface; The geometric orientation of the lines of flux in the vicinity of an electrically charged object; Described as lines surrounding a current carrying conductor as they appear in a plane perpendicular to a conductor; An electrostatic field between two oppositely charged fields in a plane containing the centers of both poles.

9. Linearity (%): Specifying a given straight line as a standard, the proximal values of a calibration curve to that line. Linearity may be expressed as maximal deviation of the calibration curve from that specified line.
10. Mechanical null: The sensor's physical housing reference relationship to the electrical null.
11. Noble (metal or potential): A noble metal is one for which the equilibrium in the reaction $M \rightarrow M^+ + ne$ (where n=a low integer; e=the electron) is toward the left; a noble metal does not readily tend to furnish ions, and therefore does not dissolve readily, nor easily enter into such reactions as oxidations, etc. A noble potential is the electrode potential of a noble metal.
12. Null drift, electrical: A fluctuation of a stationary sensor's electrical output at the null position over time.
13. Polarization: The change in the potential of an electrode during electrolysis, such that the potential of an anode always becomes more noble, and that of a cathode less noble, than their respective static potentials. Equal to the difference between the static potential and dynamic potential.
14. Shield (verb): To alter the normal current distribution on an anode or cathode by the interposition of a conductor or non-conductor.
15. Shield (noun): A conducting or non-conducting medium for altering the current distribution on an anode or cathode.
16. Stray current: Two types of stray current should be recognized. In the first, a portion of the current takes some path other than the intended one through the solution, and in the most common case this is through the metal tank walls or bottom when an unlined metal tank is used, or when the non-conductive lining is perforated in several places. Other than the obvious fact that the desired current distribution is upset, there are side effects, which may sometimes be more serious. Thus, the tank becomes in effect a series of intermediate electrodes and will tend to plate up on areas near the anode whereas the secondary electrode exhibits background effects.
17. Tank voltage: The total voltage between the anode and cathode of a plating bath or electrolytic cell during electrolysis. It is equal to the sum of (a) the equilibrium reaction potential (b) the IR drop, and (c) the electrode polarization.
18. Thief: An auxiliary cathode so placed as to divert to itself some current from portions of the work, which would otherwise receive too high a current density.
19. Throwing power: The improvement of the coating (usually metal) distribution ratio over the primary current distribution ratio on an electrode (usually cathode). Of a solution, a measure of the degree of uniformity with which metal is deposited on an irregularly shaped cathode. The term may also be used for anodic processes for which the definition is analogous.

SUMMARY OF THE INVENTION

The present invention comprises an electrolytic tilt sensor that includes a metal containment envelope having at least two apertures formed therein. The interior of the envelope defines a chamber, which is partially filled with an electrolytic solution. At least two electrodes are provided. Each electrode has an electrically active portion located within the chamber and a lead portion extending to the exterior of the envelope through a corresponding one of the apertures. An insulating material is provided in each aperture that supports each respective electrode and insulates it from the envelope.

In another aspect, the present invention comprises an electrolytic tilt sensor that includes a containment envelope defining a chamber, a longitudinal axis, and four apertures located in the envelope. The apertures are arranged in quadrature around the longitudinal axis. The containment envelope includes a first metal member having an opening therein and a second metal member sealingly engaging the opening in the first member. The chamber is partially filled with an electrolytic solution. The tilt sensor includes four electrodes, each electrode having an electrically active portion located within the chamber in parallel relationship with the longitudinal axis and a lead portion extending to the exterior of the envelope through a separate one of the apertures. Each aperture has an insulator located therein between each respective electrode and the envelope.

In yet another aspect, the invention comprises a method of assembling an electrolytic tilt sensor. The method includes providing a metal container having an opening and interior surfaces defining a containment volume, providing a metal header and providing an electrolytic solution. The containment volume is partially filled through the opening with the electrolytic solution. The header is engaged with the opening and sealingly welding the header to the enclosure.

Heretofore, based on the principles of electrolytic chemistry, one skilled in the art would not have been motivated to make an electrolytic tilt sensor having an envelope made entirely of metal. For example, the tilt sensors in U.S. Pat. No. 5,630,280 to Crossan, Jr. and German Patent Publication No. DE 40 25 184 A1 to Geisel each have non-conductive closures, which support the sensing electrodes. Predictably, these tilt sensors do not have completely metallic envelopes. Conventional electrolytic chemistry tends to show that providing the Crossan, Jr. and Geisel tilt sensors with metallic closures similar to the header of the present invention would have detrimental effects on the operating characteristics of these sensors. Moreover, tilt sensors having enclosures made entirely of glass are free from undesirable electrolytic phenomena related to the flow of polarizing electrical current.

Alternating current voltage (ACV) and direct current voltage (DCV) polarization principles, which involve current distribution, shielding (thieves), and stray currents, have been developed through studies of the effects of direct current. These principles are described in Electroplating Engineering Handbook, $2^{nd}$ Ed., K. Graham, Reinhold Publishing Corporation, N.Y., 1962.

The similarity of the electrical current relationships resulting from DCV and ACV allows the following comparison from the Electroplating Engineering Handbook, "The distribution of an Electro deposit over an electrode object is determined by the local current density at each point as well as the cathode efficiency of the bath at that current density. The local current density in turn is determined by the primary current distribution and the local polarization. The current distribution over an electrode in the absence of polarization and other distribution factors of the electrodes is called the primary current distribution. It is determined solely and completely by the geometry of the system which includes the shape and size of the electrodes, their conductivity, and in the rare case when they are not equipotential surface, the spatial relationships of the electrodes to each other and to the electrolyte boundaries, the conductive nature of these boundaries, and the shape and location of any other conductive or nonconductive bodies in the electrolyte. In practice, such bodies would be either thieves or shields."

Electrical current electrode flux relates to the metallic header of the present invention that is separated from the electrodes by small glass insulators and is welded to the metallic container. The geometric configuration of the tilt sensor of the present invention has the potential to provide an electrical resistance effect, between electrodes, resulting from the electrolyte being in parallel electrical resistance with the highly conductive metal closure. This electrical complexity is further exaggerated by the relationship between the closure and container at their welded juncture. A tilt sensor is an acquiescent or still bath, which amplifies the importance of the electrode flux relationship. The ionic concentration gradient at the electrode surface in an acquiescent bath (cell) is controlled by a very slow diffusion process. Most plating baths are stirred to overcome the slowness of the diffusion process. Convection can also affect the concentration gradient and stray current influences.

The theoretical detrimental effects, termed "secondary electrode background effects," would be caused by current flux distribution, particularly between the conductive header and the electrically active portions of the electrodes, which are separated only by a relatively thin glass bead insulator. This situation, in theory, would cause an undesirable ionic electrical resistance effect in the electrolytic solution due to the solution being in parallel resistance with the highly conductive metal header's inner surface. Moreover, an electrolytic tilt sensor is an acquiescent or still bath wherein the ion concentration gradient surrounding the electrodes is subject to slow diffusion, which theoretically accentuates the detrimental effects cause by current flux distribution.

Another cause of these secondary electrode background effects would be stray currents, wherein the current in the electrolytic solution is disturbed by the close proximity of the conductive header to the electrodes. Stray currents theoretically would cause the regions of a metallic header adjacent to the excited electrodes to act as electrodes having a charge the same as that of the excited electrodes. The regions of the metallic enclosure farther away from the excited electrodes would act as electrodes having a charge opposite that of the excited electrodes. As a result, the envelope would be bipolar, which would affect the linearity of the output voltage.

However, upon experimentation with the tilt sensor of the present invention, it was unexpectedly found that the combination of the metal enclosure and the metal header did not exhibit any undesirable behavior resulting from the secondary electrode background effects. As seen in FIGS. 5–8, the graphs of output voltages versus tilt angle for various excitation modes of the sensor are substantially identical to one another and are generally mathematically linear for tilt angles between approximately ±65° and approximately ±70°. Conventional electrolytic chemistry principles would have predicted highly nonlinear voltage-tilt angle curves as well as varied curve shapes for the different excitation modes.

An additional surprising discovery was that the electrically conductive, weld-configured surfaces of the metallic envelope were not detrimental to the performance of the tilt sensor, but provided a neutral effect along the conductive path of the excitation signal supplied to the tilt sensor. This result was achieved regardless of whether the tilt sensor was driven through the sensing electrodes to the center common electrode or from the center common electrode to the sensing electrodes.

It was further discovered that the electrically conductive surface of the envelope establishes an electrical equilibrium thereon in the null gravity position when the tilt sensor is energized, thus creating an electrically balanced potential. This phenomenon was achieved regardless of whether the tilt sensor was driven from the sensing electrodes to the center common electrode or from the center common electrode to the sensing electrodes. These results would not have been predicted by conventional electrolytic chemistry principles.

Still further discovered was that the presence of the welded joint between the header and the container did not generate detrimental galvanic cell effects. Surprisingly, self-generating direct current of the electrolytic cell did not sufficiently occur to upset the voltage output linearity or null equilibrium. In addition, the potential galvanic effects did not corrode the internal surfaces of the tilt sensor.

BRIEF DESCRIPTION OF THE DRAWINGS

For the purposes of illustrating the invention, the drawings show a form of the invention that is presently preferred. However, it should be understood that this invention is not limited to the precise arrangements and instrumentalities shown in the drawings.

DETAILED DESCRIPTION OF THE DRAWINGS

Figure 1:
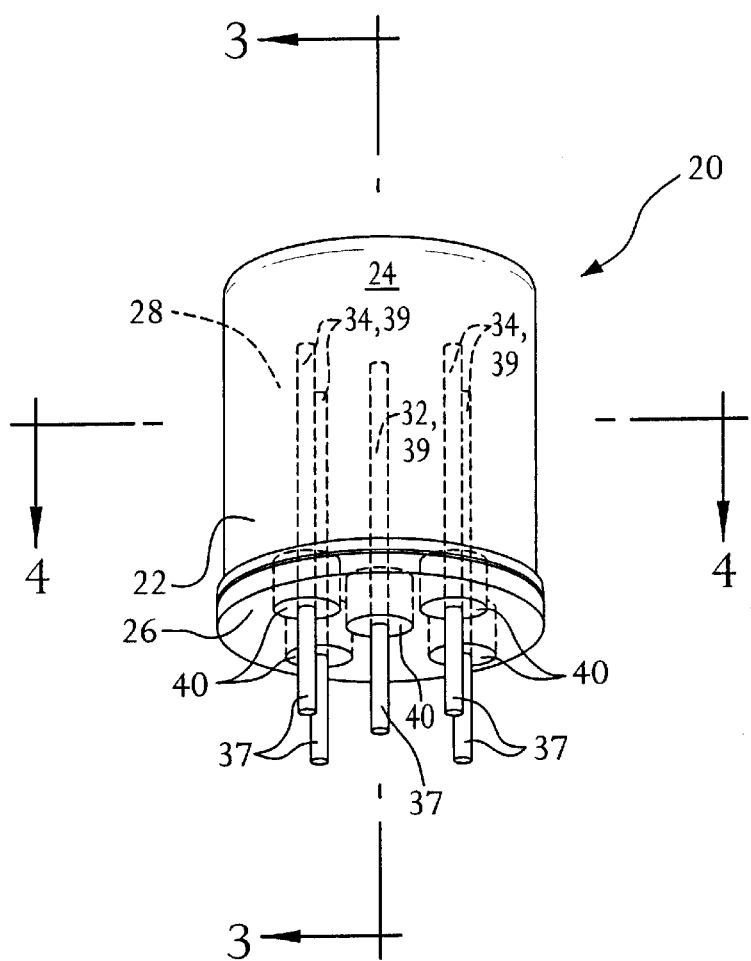
FIG. 1 is a perspective view illustrating an electrolytic tilt sensor according to the present invention.
Figure 1A:
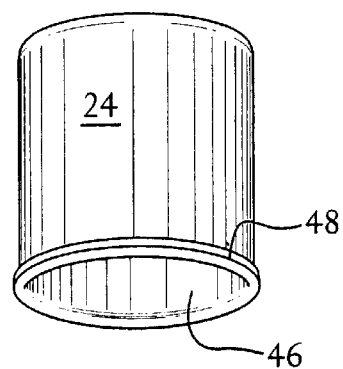
FIG. 1A is a perspective view of the metal container of the electrolytic tilt sensor shown in FIG. 1.

Referring to the drawings, wherein like numerals indicate like elements, FIGS. 1–4 illustrate an electrolytic tilt sensor, which is designated generally by the numeral 20. The tilt sensor 20 comprises a containment assembly 22 having a generally cylindrical shape. The containment assembly 22 includes a metallic container 24 and a metal header 26. The metallic container 24 and header 26 define a chamber 28, which is partially filled with an electrolytic solution 30.

Figure 3:
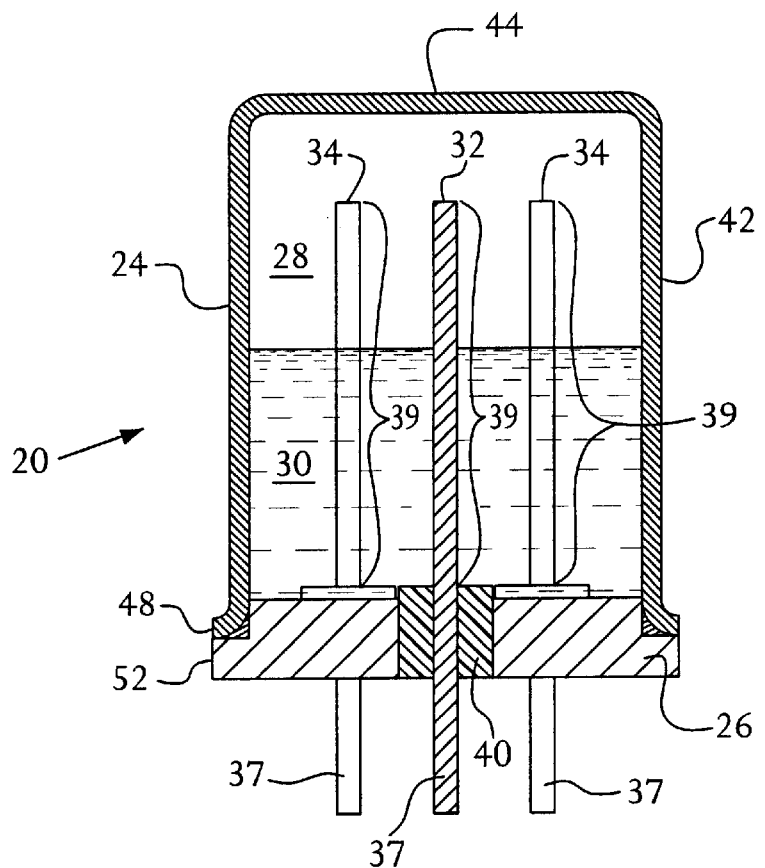
FIG. 3 is a cross-sectional view of the electrolytic tilt sensor taken along line 3—3 of FIG. 1.
Figure 4:
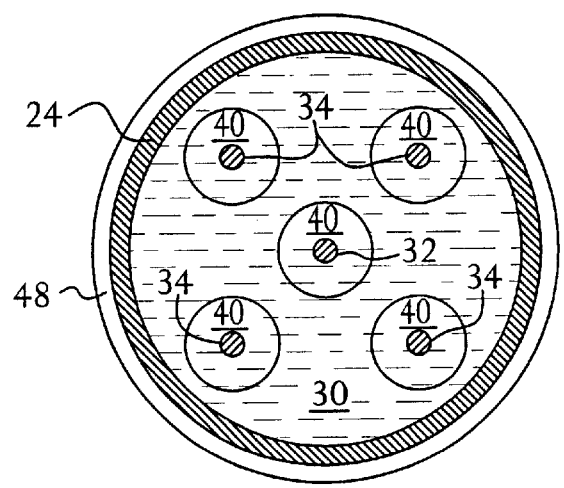
FIG. 4 is a cross-sectional view of the tilt sensor taken along line 4—4 of FIG. 1.
Figure 3A:
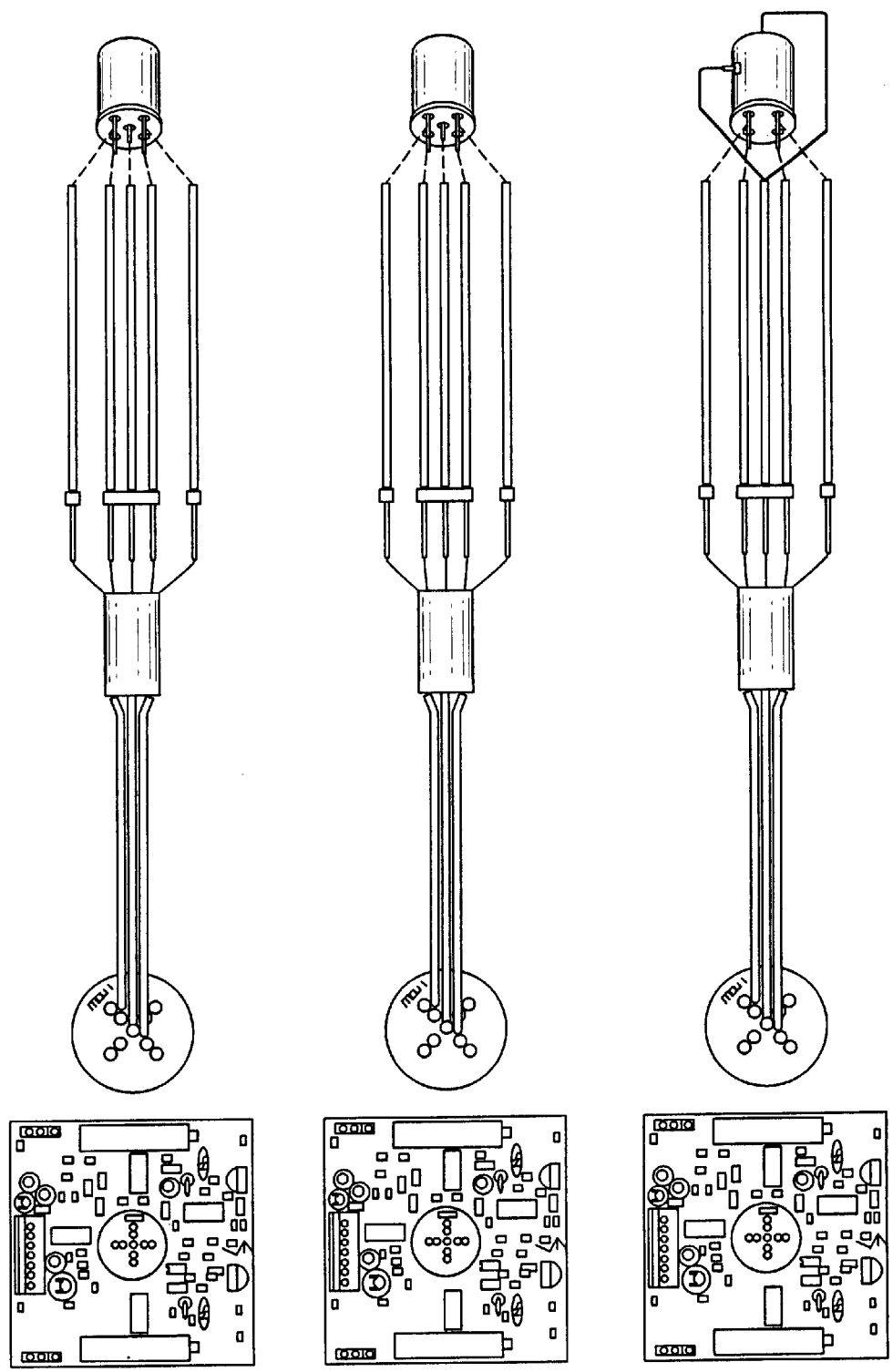
FIG. 3A are diagrams illustrating electrical connections used to connect the tilt sensors of FIGS. 2, 2C and 2D to appropriate electrical circuits.
Figure 5:
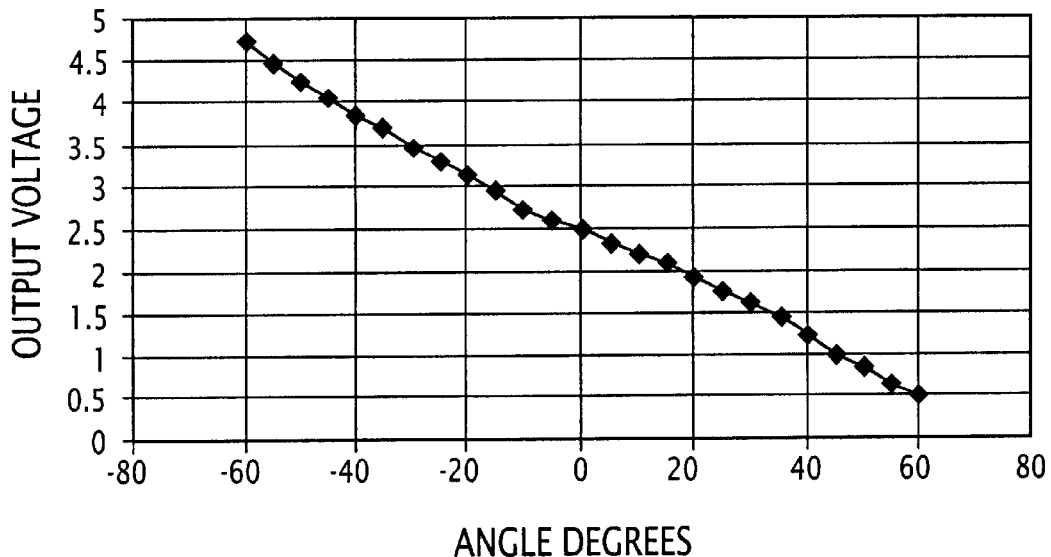
FIG. 5 is a graph of output voltage versus tilt angle when the tilt sensor is energized from the sensing electrodes to the envelope.
Figure 6:
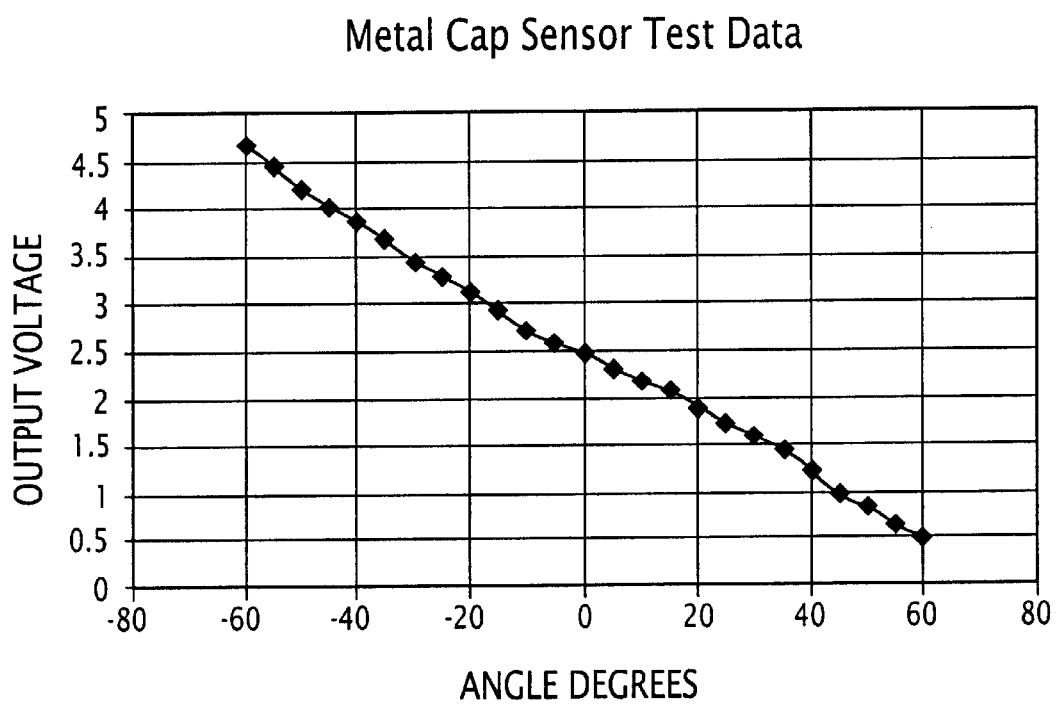
FIG. 6 is a graph of output voltage versus tilt angle when the tilt sensor is energized from the center electrode and the envelope to the sensing electrodes.
Figure 7:
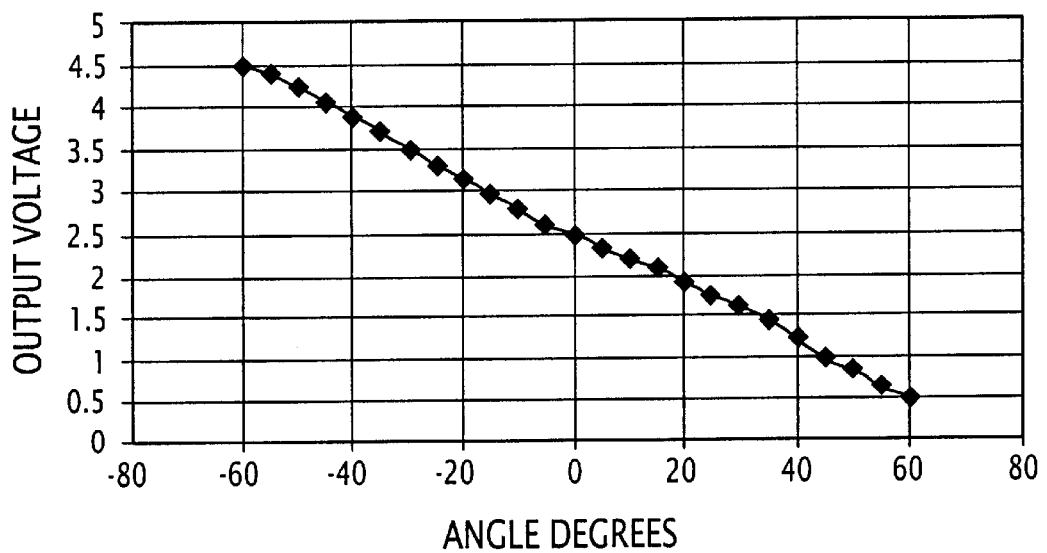
FIG. 7 is a graph of output voltage versus tilt angle when the tilt sensor is energized from the sensing electrodes to the center electrode.
Figure 8:
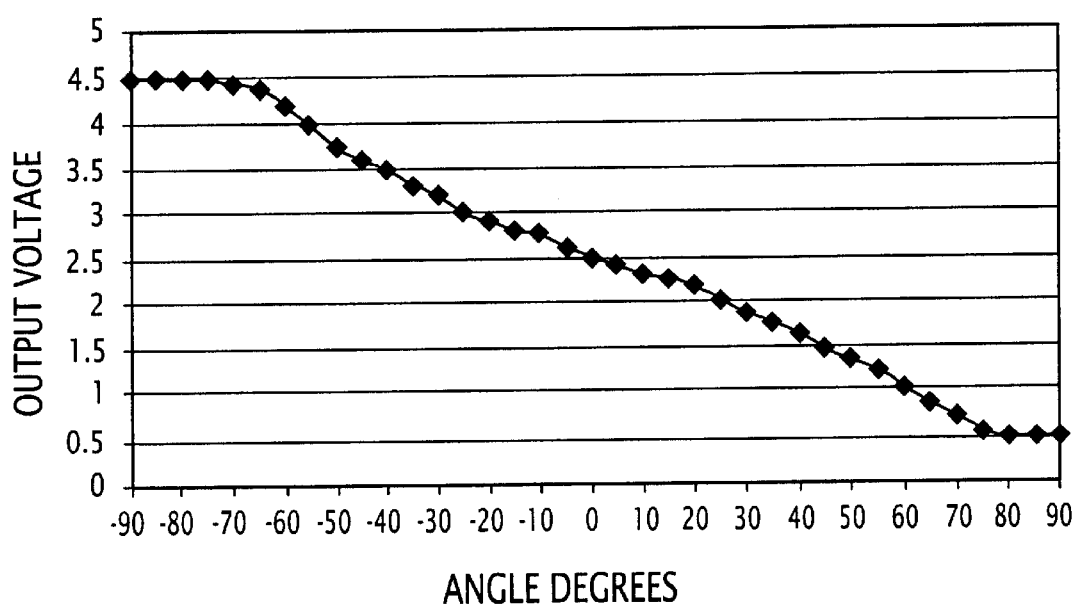
FIG. 8 is a graph of output voltage versus tilt angle when the tilt sensor is energized from the sensing electrodes to the envelope and the center electrode.
Figure 10:
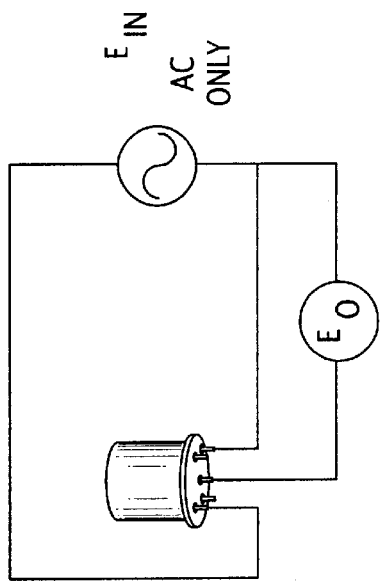
FIG. 10 is a circuit diagram of an electrical circuit used to drive the tilt sensor of FIG. 1 from the sensing electrodes to the center common electrode.
Figure 9:
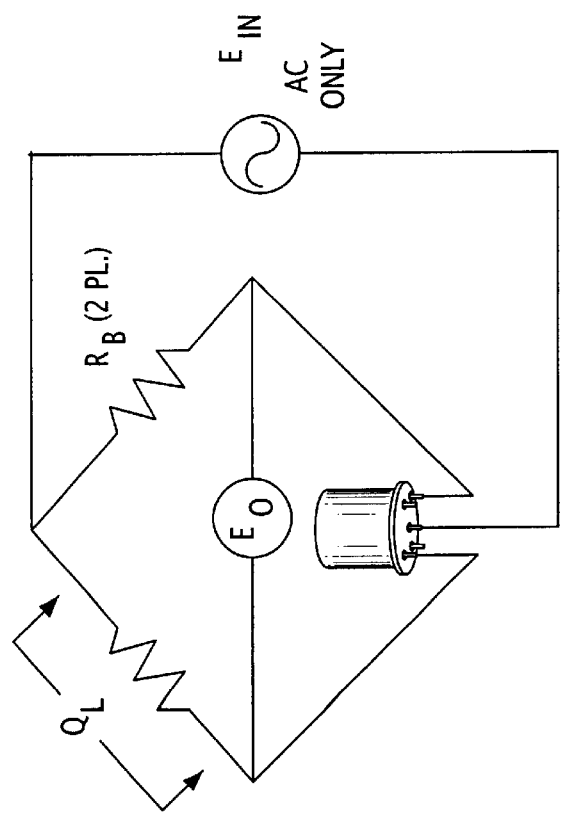
FIG. 9 is a circuit diagram of an electrical circuit used to drive the tilt sensor of FIG. 1 from the center common electrode to the sensing electrodes.

A plurality of pin-type electrodes 32, 34 extend from outside the containment assembly 22 into the chamber 28 through a plurality of apertures 36, 38 in the header 26. The portions of the electrodes 32, 34 outside the containment assembly 22 are terminal portions 37 for connecting the tilt sensor to an appropriate electrical circuit, such as illustrated in FIGS. 9 and 10. The portions of the electrodes 32, 34 inside the containment assembly 22 are electrically conductive portions 39 that are subject to immersion in the contained electrolytic solution 30, which is shown in FIG. 3. The electrodes 32, 34 are electrically insulated from the header 26 by insulators 40, which also support the electrodes 32, 34 in the apertures 36, 38.

The metallic container 24 has a side wall 42 and a top wall 44 attached to or integral with the upper end of the side wall 42. In the illustrated and preferred embodiment, the metallic container 24 is a commercially available transistor cap, such as those manufactured by Richards Metal Products, Inc. of Wolcott, Conn. Whether or not a commercially available container is used, it is preferred that the side wall forms a cylindrical tube and the top wall is planar and formed integral with the side wall. However, the side wall may be another shape, such as rectangular or other axially symmetric shape, and the top wall may have another shape such as arcuate, or the like. The lower end of the side wall 42 defines an opening 46 in the metallic container 24 and terminates at an outwardly-turned lip or flange 48 Although it is preferred to provide a flange to facilitate attaching the header to the cap, it need not be provided. In an alternative embodiment, the outer surfaces of the containment assembly may include a non-conductive outer layer such as a plastic shell, a protective polymer coating, or the like.

The header 26 comprises a planar disc 50 having a flange 52 around its outer periphery. In the illustrated and preferred embodiment, the header 24 is one that is commercially available, such as those manufactured for the transistor industry. Other headers, however, may be used. As illustrated in FIGS. 2A and 3, the outer periphery of the disc 50 engages the inner periphery of the side wall 42 and the upper surface of the flange 52 engages the lower surface of the flange 48.

A hermetic, continuous seal is provided at the interface between the two flanges 48, 52, preferably by welding. The preferred method of welding the flanges 48, 52 to one another is to use an instantaneous method, which utilizes an annular welding ridge 54 on the flange 52. During welding, the welding ridge 54 concentrates the welding current and is thereby melted to form a weld bead that joins the header 26 to the metallic container 24 and hermetically seals the containment assembly 22.

Figure 2:
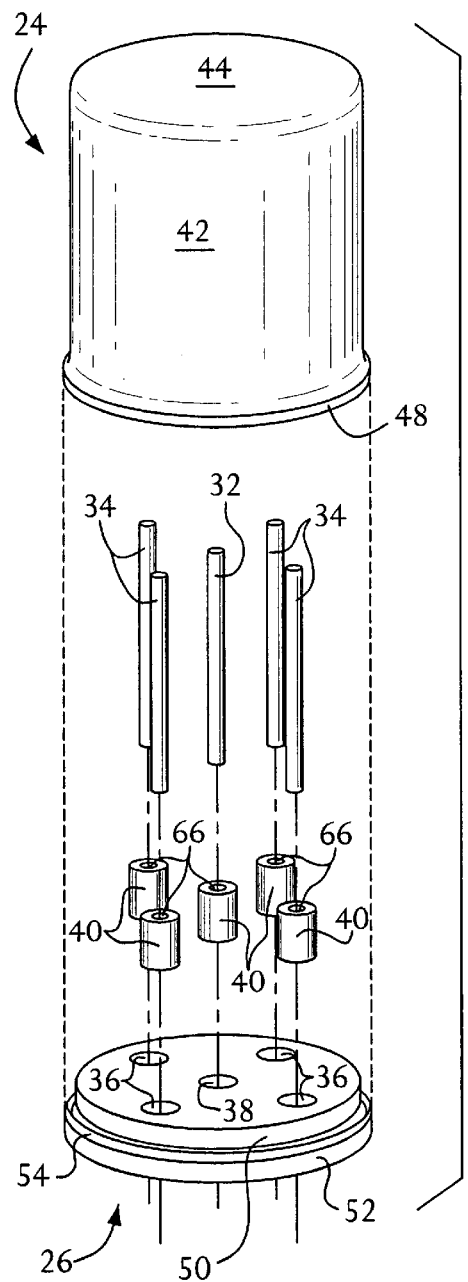
FIG. 2 is an exploded perspective view of the tilt sensor shown in FIG. 1.
Figure 2A:
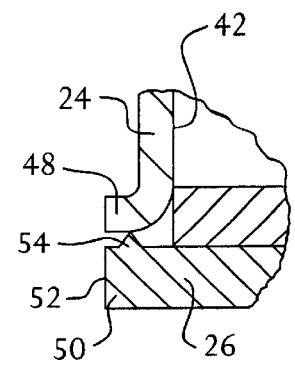
FIG. 2A is an enlarged partial sectional view of the tilt sensor illustrated in FIG. 1 showing the welding ridge between the container and header prior to welding.
Figure 2B:
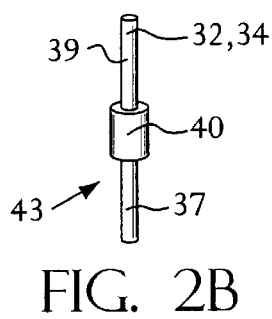
FIG. 2B is an elevational view of one of the electrode-insulator subassemblies of the tilt sensor shown in FIG. 1.

As illustrated in FIG. 2, the header 26 includes five apertures 36, 38 that receive the conductor-insulator subassemblies 43 shown in FIG. 2B. Four of the apertures 36, for the sensing electrodes 34, are arranged in quadrature around the center of the header 26 The fifth aperture 38, for the center common conductor 32, is located at the center of the header 26. Although five apertures are indicated for accommodating five electrodes, more or fewer apertures may be provided depending on the number of pin-type electrodes used. In an alternative embodiment of the present invention, the apertures may be located in the upper wall of the container instead of the header. However, the header would still be attached to the container as described above, preferably by welding.

Figure 2C:
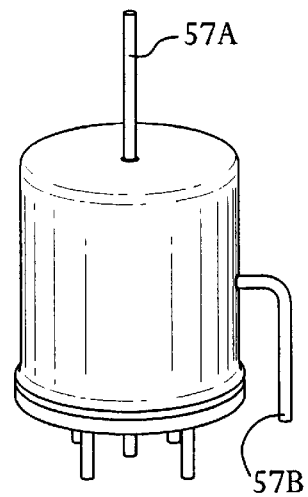
FIG. 2C is a perspective view of an alternative embodiment of a tilt sensor according to the present invention.
Figure 2D:
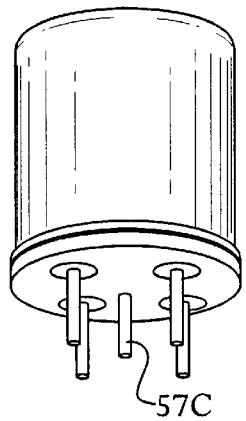
FIG. 2D is a perspective view of an alternative embodiment of a tilt sensor according to the present invention.

As shown in the alternative embodiments of FIGS. 2C and 2D, the center common electrode 32 may be eliminated, in which case the containment assembly would function as a common electrode. To connect the containment assembly to an electrical circuit, terminals, such as terminals 57A, 57B, and 57C, may be attached to the container and/or header, for example, by metallic solder, various forms of welding, brazing, compressive mechanical means, or the like. Moreover, terminals 57A and 57B may be used in conjunction with the center common electrode such that both the center common electrode and the containment assembly would function as a common electrode.

The metallic container 24 and the header 26 are preferably made of one or more nonprecious metals, such as Grade A nickel, cold-rolled steel plated with nickel, KOVAR® alloy, Alloy 52, or the like (KOVAR® is a registered trademark of Carpenter Technologies Corporation, Reading, Pa.). The metal or metallic alloy is selected to be noncorroding in the presence of the electrolytic solution used. Alternatively to nonprecious metals, the container 24 and header 26 may be made of a precious metal. In the embodiment illustrated in the drawings and described herein, it is critical that the coefficient of thermal expansion of the material selected for the header 26 is compatible with that of the insulators 40 to keep the chamber hermetically sealed. Also important to maintaining the hermetic seal is the glass-to-metal seal bond between the header 26 and the insulators 40.

The pin-type electrodes 32, 34 include a center common electrode 32 and two pairs of spaced apart sensing electrodes 34. The electrodes 34 in each sensing conductor pair are located at diametrically opposite locations relative to the center electrode 32 and define a distinct tilt axis with the common electrode 32. The number and arrangement of the electrodes are design variables that are known and would be selected by, those skilled in the art.

The sensing electrodes 34 are preferably arranged in quadrature about the center axis of the chamber, and the common electrode 32 is preferably located at the center axis. Being located in quadrature, the two pairs of diametrically opposed electrodes define two orthogonal tilt axes, for example, Cartesian X and Y axes. In this configuration, the output voltages of the sensing electrodes are measured and correlated to one another to provide the angle of tilt regardless of direction. In addition, if a direction reference is established, the output voltages may be further used to determine the direction of tilt.

The preferred electrodes are the pin-type electrodes shown. However, other types of electrodes, such as ones having pin-type electrically active portions 37 and flexible wire terminal portions 37 may be used. Moreover, the electrically active portions may be other than pin shaped to suit a particular application of the tilt sensor 20. For example, the electrically active portions may be arcuate, coiled, meandering, or the like. Also, the terminal portions may comprise strips, braids, foils, or the like. The presently-preferred electrode materials are KOVAR® alloy and Alloy 52. These alloys are preferred because their coefficients of expansion are compatible with the coefficient of expansion of the material preferred for the insulators. However, other nonprecious metals, alloys and precious metals may be used.

In the preferred embodiment, the insulators 40 are glass beads, such as Corning 7052 glass available from Corning Incorporated, Corning, N.Y. Each glass bead has a center bore 66 for receiving a corresponding one of the electrodes 32, 34. Other insulator materials, such as porcelain, ceramic, or the like, may be used. Regardless of which material is selected, the aforementioned concerns regarding the compatibility of coefficients of expansion of the various components must be addressed.

The electrolytic solution 30 may be selected from a group comprising nonaqueous, semi-aqueous and noncorrosive solutions. Preferably, the electrolytic solution is a non-halogenated solution, which generally has a non-deleterious effect on the nonprecious metal components of the preferred embodiment. Halogenated solutions should be used only with precious metal components.

As stated above, the tilt sensor 20 may be energized utilizing the containment assembly 22 or the center conductor 32 as the common electrode or utilizing the combination of the two as the common electrode. Moreover, the tilt sensor 20 may be energized from the sensing electrodes 34 to the common electrode, i.e., the center electrode 32 and/or the containment assembly 22, or from the common electrode to the sensing electrodes 34. FIGS. 5–8 show graphs of output voltage versus angle of tilt for four different modes of energizing the tilt sensor 20.

The tilt sensor of the present invention may be assembled economically using the following process, particularly if the metallic container is commercially available, for example, to the transistor industry.

Using the embodiment illustrated in FIGS. 1–4 as an example, a header subassembly is assembled by placing the header into a holder, placing the insulators 40 into the apertures 36, 38, inserting the wire-like electrodes 32, 34 into the center bores 66, and heating the header subassembly to a temperature where the glass becomes plastic, such that the spaces between the insulators and metal components fill with glass to form a hermetic glass-to-metal seal.

After assembling the header assembly, it is united with the metallic container 24 using a manual, semi-manual, or fully automatic resistance-type welding machine. The welding machine used to assemble the presently-preferred tilt sensor 20 is made by C.W. Middlestead Company of Newtown Square, Pa. The welding machine includes an upper electrode for receiving the header assembly and a lower electrode for contacting the metallic container 24. Preferably the upper and lower electrodes of the welding machine are cooled or chilled by water or other means in the regions where the tilt sensor is assembled. In the preferred embodiment the upper and lower electrodes include passageways that allow cooling water to be circulated within the electrodes.

A unique advantage of the invention is that the sensor may be assembled and the electrolyte introduced into the container without the need for a fill hole. This makes the sensor easier to fabricate, and eliminates the need to seal a fill hole. Absence of a fill hole improves the integrity of the container, and improves the overall reliability of the sensor.

The above-described process is a quick and efficient method of manufacturing an electrolytic tilt sensor according to the present invention. However, other methods of assembly may be used.

Although the invention has been described and illustrated with respect to the exemplary embodiment thereof, it should be understood by those skilled in the art that the foregoing and various other changes, omissions, and additions may be made therein and thereto, without parting from the spirit and scope of the present invention.

What is claimed is:

1. An electrolytic tilt sensor, comprising:
    a metallic containment envelope having at least two apertures formed therein and an interior chamber;
    an electrolytic solution partially filling the chamber;
    at least two electrodes, each electrode having an electrically active portion located within the chamber and a lead portion extending to the exterior of the envelope through a corresponding one of the apertures; and
    an insulating material located in each aperture for supporting the respective electrode and insulating it from the envelope.

2. The electrolytic tilt sensor of claim 1 wherein the envelope is made of a nonprecious metal.

3. The electrolytic tilt sensor of claim 2 wherein the electrolytic solution is unhalogenated.

4. The electrolytic tilt sensor of claim 1 wherein the containment envelope further comprises an outer layer of non-conductive material.

5. The electrolytic tilt sensor of claim 1 wherein the containment envelope comprises a container and a header, the container defining an opening and the header sealingly engaging the opening.

6. The electrolytic tilt sensor of claim 5 wherein the apertures are located in the header.

7. The electrolytic tilt sensor of claim 5 wherein the container and the header are welded to one another.

8. The electrolytic tilt sensor of claim 5 wherein the container is a tube closed at one end and the end opposite the closed end defines the opening.

9. The electrolytic tilt sensor of claim 8 wherein the tube has a cylindrical shape.

10. The electrolytic tilt sensor of claim 9 having four electrodes and wherein the chamber has a center axis concentric with the tube, the contact portions of the four electrodes are located in quadrature and each of the contact portions has a longitudinal axis oriented parallel to the center axis of the chamber.

11. The electrolytic tilt sensor of claim 10 wherein the lead portions of the electrodes pass through apertures located in the header.

12. The electrolytic tilt sensor of claim 10 further comprising a fifth electrode having an electrically active portion located along the center axis.

13. The electrolytic tilt sensor of claim 4 further comprising an electrical lead attached to and in electrical communication with the containment envelope.

14. The electrolytic tilt sensor of claim 1 wherein the insulating material is glass.

15. The electrolytic tilt sensor of claim 14 wherein the glass forms a glass-to-metal seal with the containment envelope and the corresponding electrode.

16. The electrolytic tilt sensor of claim 1 wherein the insulating material is glass coated ceramic.

17. An electrolytic tilt sensor, comprising:
    a metallic containment envelope comprising a container and a header, the envelope defining a chamber and having at least three apertures;
    an electrolytic solution partially filling the chamber;
    at least three electrodes extending through a corresponding one of the apertures, each electrode having an electrically active portion located within the chamber and spaced apart from an interior surface of the envelope and a lead portion extending to the exterior of the envelope, two of the electrodes being sensing electrodes and the other electrode being a common electrode; and an insulating material located in each aperture between the corresponding electrode and the envelope.

18. The electrolytic tilt sensor of claim 17 wherein four sensing electrodes are arranged in quadrature concentrically around the common electrode.

19. An electrolytic tilt sensor, comprising:
a containment envelope having a longitudinal axis, the envelope defining a chamber and including four apertures arranged in quadrature around the longitudinal axis, the containment envelope including
a first member made of metal and having an opening therein; and
a second member made of metal, the second member sealingly engaging the opening in the first member;
an electrolytic solution partially filling the chamber;
four electrodes, each electrode having an electrically active portion located within the chamber parallel to the longitudinal axis and a lead portion extending to the exterior of the envelope through a separate one of the apertures; and
four insulators, one insulator being located in each aperture between each respective electrode and the envelope.

20. The electrolytic tilt sensor of claim 19 wherein the second member is sealingly welded to the first member.

21. The electrolytic tilt sensor of claim 19 wherein the first member is a cylindrical tube closed at one end, the opposite end of the tube defining the opening and having an outwardly-turned flange, and the second member is generally a circular disc.

22. The electrolytic tilt sensor of claim 19 further comprising a fifth aperture, a fifth electrode, and a fifth insulator, the fifth electrode having an electrically active portion coaxial with the longitudinal axis and a lead portion extending outside the chamber through the fifth aperture, the first insulator being located in the fifth aperture between the fifth electrode and the envelope.

23. The electrolytic tilt sensor of claim 19 further comprising an electrical lead attached to and in electrical communication with the containment envelope.

24. An electrolytic tilt sensor, comprising:
a nonprecious metal container comprising a cylindrical side wall having an upper end, a lower end, and an inside surface and a planar top wall having an inside face, the top wall located at the upper end of the side wall, the lower end of the sidewall having an outwardly-turned flange and defining an opening;
a nonprecious metal header comprising a circular disc having four apertures therethrough, the header engaging the flange of the container and being sealingly welded thereto, the apertures located in quadrature with respect to the center of the disc, the side wall, top wall, and header defining an interior chamber;
a non-halogenated electrolytic solution partially filling the chamber;
four metal electrodes, each electrode having an electrically active portion located within the chamber in parallel relationship with the side wall and a lead portion extending to the exterior of the header through a separate aperture; and
four insulators, one insulator being located in each aperture between the respective electrode and the header.

25. The electrolytic tilt sensor of claim 23 further comprising a fifth aperture, a fifth electrode, and a fifth insulator, the fifth aperture located at the center of the closure, the fifth electrode having an electrically active portion parallel to the side wall of the container and a lead portion extending outside the chamber through the fifth aperture, the first insulator being located in the fifth aperture between the fifth electrode and the envelope.

26. The electrolytic tilt sensor of claim 24 further comprising an electrical lead attached to and in electrical communication with the containment envelope.

27. The electrolytic tilt sensor of claim 24 wherein the insulators are glass beads.

28. The electrolytic tilt sensor of claim 24 wherein each insulator comprises glass, the glass forming a glass-to-metal seal with header and the corresponding electrode.

29. The electrolytic tilt sensor of claim 24 wherein the insulators are glass coated ceramic.

30. A method of assembling an electrolytic tilt sensor, comprising the steps of:
providing a metal container having an opening and interior surfaces defining a containment volume;
providing a metal header;
providing an electrolytic solution;
partially filling the containment volume with the electrolytic solution through the opening;
engaging the header with the opening; and
welding the header to the container so that the containment volume is hermetically sealed.

31. The method of claim 30 further comprising the step of inserting a plurality of electrodes and insulating material into apertures in the header prior to engaging the header with the opening.

32. The method of claim 30 wherein the container is held by a welding electrode during the welding step.

33. The method of claim 32 wherein at least one of the welding electrodes is liquid cooled.

34. The method of claim 31 wherein the welding electrodes are energized for less than 0.016 seconds.

35. The method of claim 30 wherein the electrolytic solution is introduced into the container only through the opening and not through an additional opening in the container.

36. A method of assembling an electrolytic tilt sensor, comprising the steps of:
providing a metal container having an opening and interior surfaces defining a containment volume;
providing a metal header;
introducing an electrolytic solution into the containment volume to partially fill the volume with the electrolytic solution through the opening without the need for an additional opening in the metal container;
engaging the header with the opening in the partially filled container; and
welding the header to the container so that the containment volume is hermetically sealed.

* * * * *